(12) United States Patent
Abdelaziz et al.

(10) Patent No.: US 10,878,309 B2
(45) Date of Patent: Dec. 29, 2020

(54) DETERMINING CONTEXT-AWARE DISTANCES USING DEEP NEURAL NETWORKS

(71) Applicant: International Business Machines Corporation, Armonk, NY (US)

(72) Inventors: Ibrahim Abdelaziz, Thuwal (SA); Achille B. Fokoue-Nkoutche, White Plains, NY (US); Mohammad S. Hamedani, Chappaqua, NY (US); Meinolf Sellmann, Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 15/396,982

(22) Filed: Jan. 3, 2017

(65) Prior Publication Data

US 2018/0189634 A1     Jul. 5, 2018

(51) Int. Cl.
| | |
|---|---|
| *G06N 3/04* | (2006.01) |
| *G06N 3/08* | (2006.01) |
| *G06F 16/901* | (2019.01) |
| *G06F 16/903* | (2019.01) |
| *G06N 5/02* | (2006.01) |

(52) U.S. Cl.
CPC .......... *G06N 3/04* (2013.01); *G06F 16/9024* (2019.01); *G06F 16/90335* (2019.01); *G06N 3/08* (2013.01); *G06N 5/022* (2013.01)

(58) Field of Classification Search
CPC ....................................... G06N 3/04
USPC ......................................................... 706/25
See application file for complete search history.

(56) References Cited

U.S. PATENT DOCUMENTS

| | | | |
|---|---|---|---|
| 8,561,184 B1 * | 10/2013 | Marsa .................... | H04L 67/22 726/22 |
| 10,134,389 B2 * | 11/2018 | Hakkani-Tur ........ | G10L 15/063 |
| 2009/0012842 A1 | 1/2009 | Srinivasan et al. | |
| 2012/0158633 A1 | 6/2012 | Eder | |
| 2014/0156274 A1 * | 6/2014 | You ........................ | G10L 15/34 704/244 |

(Continued)

OTHER PUBLICATIONS

Kallem, "Artificial Intelligence Algorithms", IOSR Journal of Computer Engineering, vol. 6, Issue 3 (Sep.-Oct. 2012), pp. 01-08 (Year: 2012).*

(Continued)

*Primary Examiner* — Hien D Khuu
(74) *Attorney, Agent, or Firm* — Scully, Scott, Murphy & Presser, P.C.; Vazken Alexanian (57) ABSTRACT

A knowledge graph is traversed by receiving a knowledge graph at a deep neural network, the knowledge graph including a plurality of nodes connected by a plurality of edges, each respective edge of the plurality of edges being associated with a corresponding distance representing embedded semantic information. The deep neural network is trained to capture the embedded semantic information. A path query is received at the deep neural network. A context is determined for the received path query at the deep neural network. The deep neural network performs the traversing of the knowledge graph in response to the received path query, based upon the determined context and the embedded semantic information.

15 Claims, 4 Drawing Sheets

(56) References Cited

U.S. PATENT DOCUMENTS

| | | | | |
|---|---|---|---|---|
| 2015/0033106 | A1* | 1/2015 | Stetson | G06F 16/24566 715/215 |
| 2015/0379414 | A1* | 12/2015 | Yeh | G06F 16/9024 706/11 |
| 2016/0224637 | A1 | 8/2016 | Sukumar et al. | |
| 2016/0239545 | A1* | 8/2016 | Stetson | G06F 16/24566 |
| 2017/0068903 | A1* | 3/2017 | Hakkani-Tur | G06N 20/00 |
| 2017/0221240 | A1* | 8/2017 | Stetson | G06T 11/206 |
| 2018/0089265 | A1* | 3/2018 | Gerard | G06F 16/24535 |

OTHER PUBLICATIONS

Fan et al., "Distributed representation learning for knowledge graphs with entity descriptions", 2016, Elsevier, p. 31-37. (Year: 2016).*

Huang et al., "Leveraging Deep Neural Networks and Knowledge Graphs for Entity Disambiguation", 2015, p. 1-10. (Year: 2015).*

Shen et al., "Link Prediction using Embedded Knowledge Graphs", 2018, p. 1-14. (Year: 2018).*

Mitchell, T. et al; "Never-Ending Learning", AAAI Conference on Artificial Intelligence, Austin, Texas, Jan. 25-30, 2015, pp. 2302-2310.

Carlson, A. et al., "Toward an Architecture for Never-Ending Language Learning", AAAI Conference on Artificial Intelligence, Atlanta Georgia, Jul. 11-15, 2010, pp. 1306-1313.

Kanter, J., "Deep Feature Synthesis: Towards Automating Data Science Endeavors", IEEE International Conference, Oct. 19-21, 2015, pp. 1-10.

Poon, H. et al., "Unsupervised Ontology Induction from Text", ACL '10 Proceedings of the 48th Annual Meeting of the Association for Computerized Linguistics, Jul. 11-16, 2010, pp. 296-305.

Franz, T. et al., "TripleRank: Ranking Semantic Web Data by Tensor Decomposition", ISWC '09 Proceedings of the 8th International Semantic Web Conference, Oct. 25-29, 2009, pp. 213-228.

Nickel, M. "Holographic Embeddings of Knowledge Graphs", AAAI '16 Proceedings of the Thirtieth AAAI Conference on Artificial Intelligence, Feb. 12-17, 2016, pp. 1955-1961.

Nickel, M., "Tensor Factorization for Multi-Relational Learning", Machine Learning and Knowledge Discovery in Databases, vol. 8190 of the series Lecture Notes in Computer Science, Printed Dec. 30, 2016, pp. 1-4.

Neelakantan, A., "Knowledge Base Completion using Compositional Vector Space Models", Department of Computer Science, University of Massachusetts, Amhert, MA, Dec. 13, 2014, pp. 1-7.

* cited by examiner

FIG. 4

DETERMINING CONTEXT-AWARE DISTANCES USING DEEP NEURAL NETWORKS

FIELD

The present application relates generally to methods and products for emulation of intelligence and, more specifically, to processes and systems that organize information gathered from multiple machine-readable sources into knowledge graphs to reveal and rank associations between entities with semantic context and meaning.

BACKGROUND

A knowledge graph is a data structure that is employed to represent semantic relations among a group of terms, entities, or objects. The knowledge graph includes a set of vertices or nodes representing the terms, entities, or objects. The vertices or nodes are interconnected by a set of edges which represent semantic relations between the terms, entities, or objects. In the case of a directed graph, each edge includes an arrow indicating a direction of association for a pair of vertices joined by the edge. A list of multiple such directed edges that consecutively connect a start node with an end node are said to form a path in the knowledge graph. When a path exists between two nodes, it is said that the end node is reachable from the start node. Knowledge graphs may be derived from various sources of data, such as scientific journals, literature, or information gathered from the Internet.

SUMMARY

The following summary is merely intended to be exemplary. The summary is not intended to limit the scope of the claims.

One embodiment of the present invention is a computer-implemented method for traversing a knowledge graph that including a plurality of nodes connected by a plurality of edges, each edge of the plurality of edges representing embedded semantic information. The method comprises receiving the knowledge graph at a deep neural network (DNN), capturing the embedded semantic information by the DNN, receiving a path query at the DNN specifying a starting node of the knowledge graph and a termination node of the knowledge graph, determining a context for the received path query, and traversing the knowledge graph, based on the context and the embedded semantic information, in response to said receiving the path query at the DNN.

Other embodiments include a computer program product and a system.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Knowledge graphs are becoming more dense and complex as more and more data sources are being ingested to create knowledge graphs with a multitude of different semantic relations. For example, and without limitation, it is becoming increasingly difficult to traverse (i.e. to find a path) on the graph in such a way that a set of consecutive relations used to link nodes (i.e. terms, entities, or objects) forms a meaningful semantic connection between a start and an end node. It is also not uncommon to find that every node in the knowledge graph is reachable from every other node if the semantic coherence of relations used to connect consecutive nodes is not considered when traversing on a path through the knowledge graph.

Figure 1:
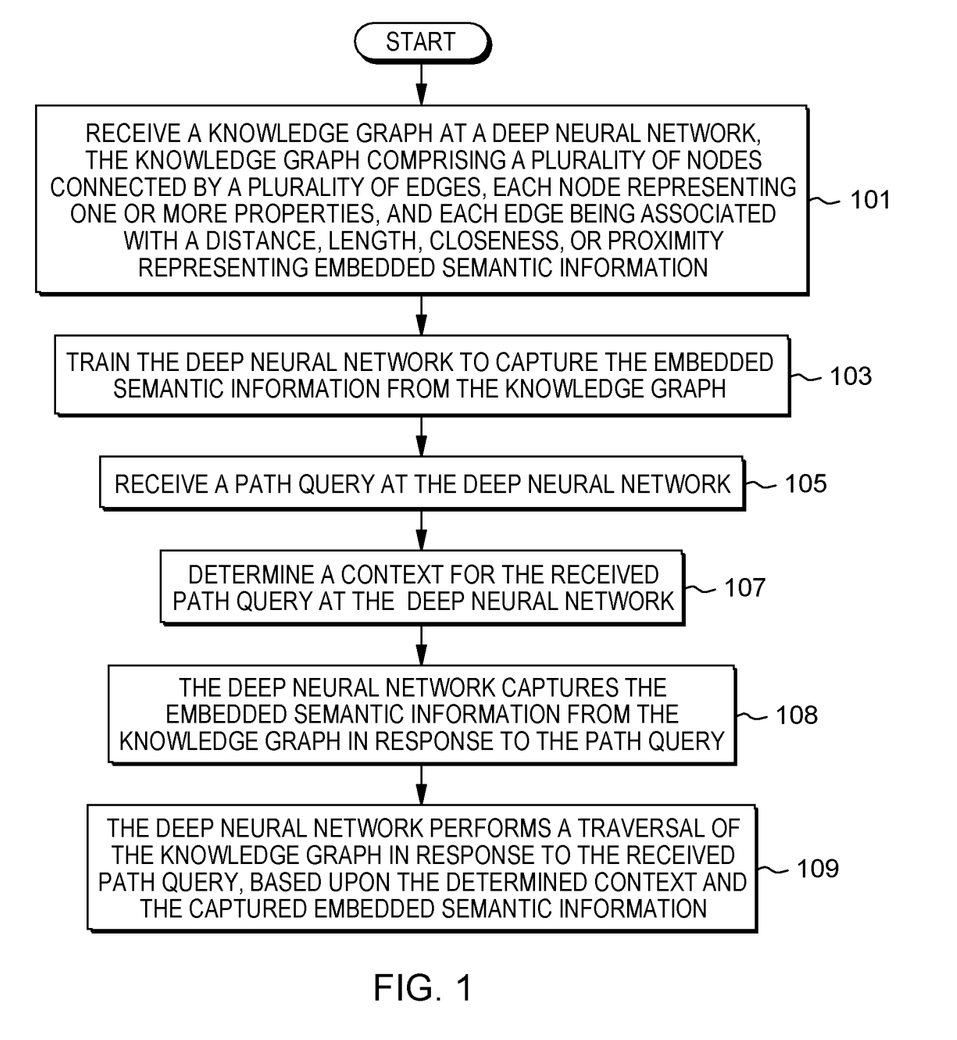
FIG. 1 illustrates an exemplary method for traversing a knowledge graph, in accordance with one or more embodiments of the present invention.

FIG. 1 illustrates an exemplary method for traversing a knowledge graph in accordance with one or more embodiments of the present invention. The method commences at block 101 where a knowledge graph is received. The knowledge graph, an example of which will be described in more detail hereinafter, comprises a plurality of nodes interconnected by a plurality of edges. Each node represents one or more terms, objects, or entities. Each edge is associated with a corresponding number that represents distance, length, closeness, relatedness, or proximity based on the embedded semantic information. For purposes of illustration, zero, one, or more than one of the edges may indicate a direction.

Figure 2:
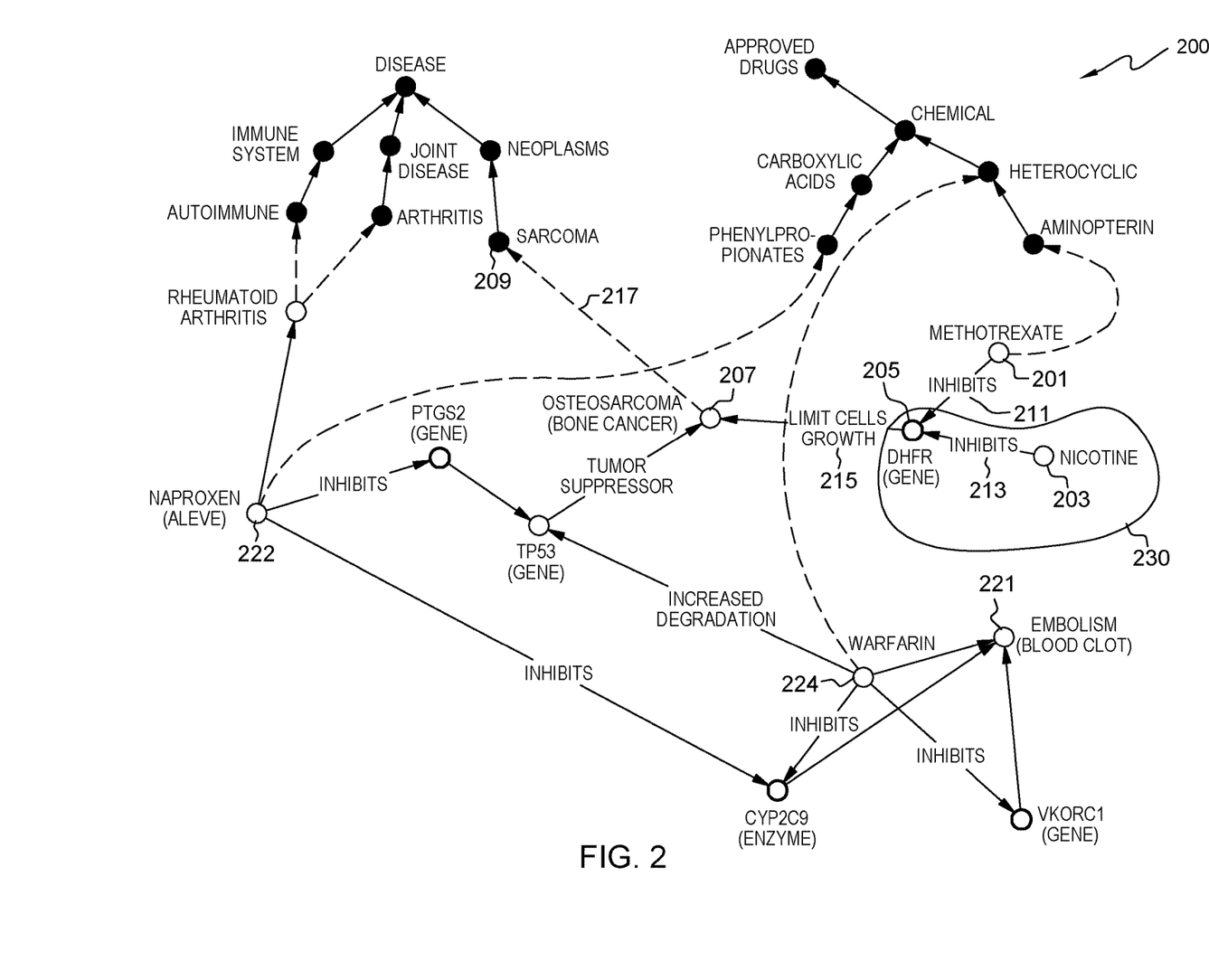
FIG. 2 illustrates an exemplary knowledge graph in accordance with one or more embodiments of the present invention.

FIG. 2 illustrates an exemplary knowledge graph 200 in accordance with one or more embodiments of the present invention. The knowledge graph 200 in this example was prepared from information obtained from a number of scientific data sources. As depicted, a plurality of nodes are interconnected by edges. Each node represents a term, entity, object, or property. For purposes of illustration only, this term, entity, object, or property may represent a drug, a target for a drug, a drug classification, a molecular class, a chemical property, a human gene, a carcinogen, or a medical disease. Referring again to the example depicted in FIG. 2: a first node 201 represents Methotrexate (a drug); a second node 203 represents Nicotine (a carcinogen); a third node 205 represents a Dihydrofolate Reductase (DHFR) gene; a fourth node 207 represents Osteosarcoma (bone cancer); a fifth node 209 represents Sarcoma; a sixth node 221 represents an embolism (blood clot); and a seventh node 222 represents Naproxen (Aleve™), which is a non-steroidal, anti-inflammatory painkiller. The DHFR gene is a protein coding gene related to folate biosyntheses and metabolism. Diseases associated with DHFR include megaloblastic anemia due to dihydrofolate reductase deficiency and pancytopenia.

Referring again to FIG. 2, a first edge 211 joins the first node 201 to the third node 205. A length, distance, closeness, or proximity of the first edge 211 relative to another edge is representative of semantic information that is indicative of an extent of inhibition. In this example, closeness is used to refer to relatedness. The first node 201 represents Methotrexate and the third node 205 represents the DHFR gene. Thus, this combination of the first node 201 and the third node 205 could be summarized as indicating that Methotrexate inhibits the DHFR gene. However, an unguided traversal of the knowledge graph 200 (without context) may lead to erroneous conclusions. For example, assume that a traversal of the knowledge graph commences at the second node 203 (Nicotine), or the seventh node 222 (Naproxen). Within a few node hops, one can reach the fourth node 207 (Osteosarcoma), thus suggesting (incorrectly) that Nicotine or Naproxen may cure bone cancer (Osteosarcoma). But, in reality, Methotrexate (the first node 201) is the only drug in knowledge graph 200 that is useful for treating bone cancer. Other examples of incorrect conclusions that might be derived from the knowledge graph 200 are that Naproxen (the seventh node 222) would be effective at avoiding an embolism (the sixth node 221), whereas Warfarin (at an eighth node 224) is the drug of choice for treating blood clots (embolisms). Incorrect conclusions may be avoided or eliminated by considering the knowledge graph 200 in context. An exemplary process for determining context is described in greater detail hereinafter with respect to FIG. 1.

Figure 3:
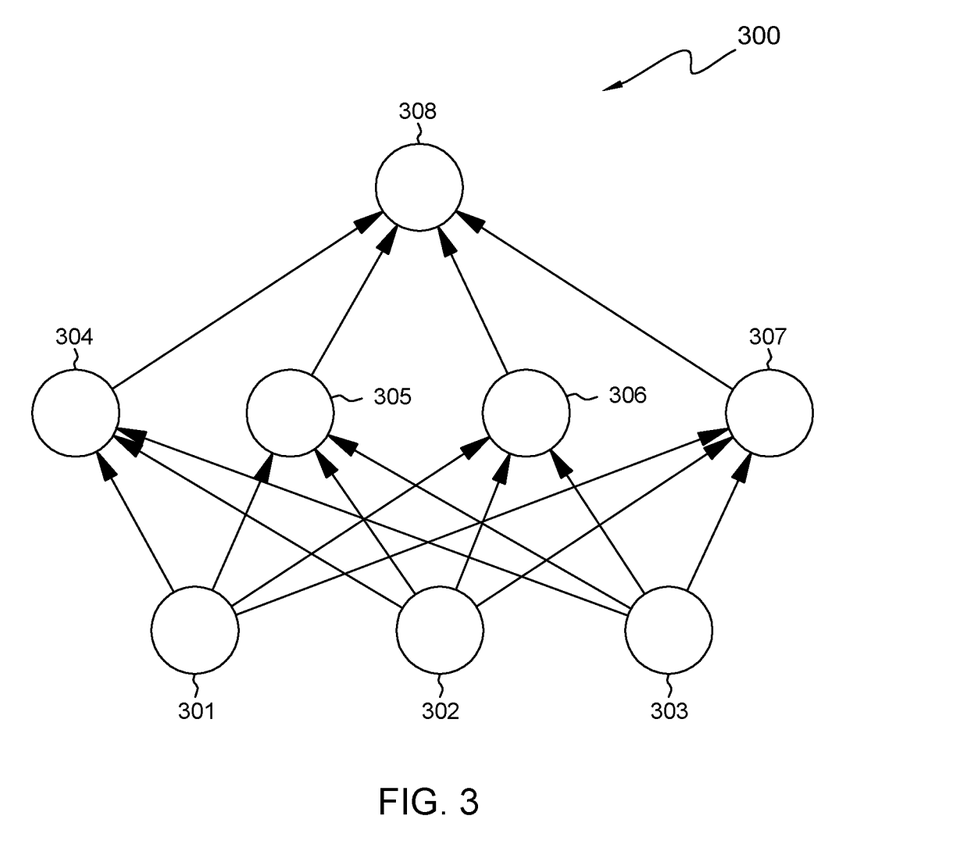
FIG. 3 illustrates an exemplary deep neural network constructed in accordance with one or more embodiments of the present invention.

Returning now to FIG. 1, the operational sequence progresses from block 101 to block 103, where a deep neural network (DNN) is trained to capture the embedded semantic information. FIG. 3 illustrates an exemplary DNN 300 comprising a plurality of input nodes 301, 302, and 303 interconnected with a plurality of hidden nodes 304, 305, 306, and 307. The plurality of hidden nodes 304, 305, 306, and 307 are interconnected with an output node 308. The DNN 300 is an artificial feed-forward neural network where interconnections between the input nodes 301, 302 and 303, the hidden nodes 304, 305, 306, and 307, and the output node 308, do not form a cycle. Rather, information in the feed-forward neural network moves in only one direction, forward, from any of the input nodes 301, 302, and 303, through any of the hidden nodes 304, 305, 306, and 307, and thence to the output node 308. The DNN 300 may be configured for modeling complex non-linear relationships.

As mentioned previously, semantic information can be embedded in each respective edge of the knowledge graph 200 (FIG. 2) in the form of a corresponding distance, length, closeness, relatedness, or proximity that is associated with the respective edge. The training procedure may use path-based training, single-edge training, or any of various combinations thereof.

Single-edge training determines or predicts whether or not a triple including a pair of nodes and an edge that joins the nodes is true or false. Consider a triple in the form of the first node 201 representing Methotrexate, the third node 205 representing the DHFR gene, and the first edge 211 representing an inhibition. If Methotrexate inhibits the DHFR gene, then the result of the training is that the triple is considered to be true. This is considered to be a single-edge query. On the other hand, if Methotrexate does not inhibit this gene, then the triple is considered to be false. In either case, the corresponding edge is embedded with corresponding semantic information.

Path-based training determines or predicts whether or not a path exists between a starting node and a terminating node where the path includes at least one intervening node between the starting node and the terminating node. For example, if the starting node is the second node 203 (Nicotine), and the terminating node is fifth node 209 (Sarcoma). A path exists between the second node 203 and the fifth node 209, e.g., including second edge 213, third node 205, third edge 215, fourth node 207, and fourth edge 217. Thus, the path-based training process uses vector space models from the knowledge graph 200 to implement, produce, or generate a traversal operator. These vector space models may be specified in a path query. The path query ascertains whether or not a path exists between a source node and a destination node of the knowledge graph 200. The destination node is sometimes referred to as a termination node. Any such path may be used to infer the existence of one or more additional edges of a new path in the knowledge graph 200. Additionally or alternatively, the path may be used to infer the existence of new information about one or more edges. The vector-space models can be used in a post-training step to answer one or more subsequent path queries for determining whether these subsequent path queries are true or false.

To provide an enhanced level of training during the training process, referred to as cognitive traversal, the input applied to input nodes 301, 302, and 303 of the DNN 300 (FIG. 3) comprises three or more nodes, $x\_\{i-1\}$, $x\_\{i\}$, and $x\_\{i+1\}$ of the knowledge graph 200 (FIG. 2), where it is known that there is a close connection, a close relatedness, or a close proximity between $x\_\{i-1\} \rightarrow x\_\{i\}$. The output node 308 of DNN 300 (FIG. 3) is set to "true" or zero if it is further known that there is a close connection, a close relationship, or a strong connection between $x\_\{i\} \rightarrow x\_\{i+1\}$; otherwise, the output of the DNN 300 is set to "false" or one. Optionally, the training process may be sensitive as to whether any of the edges of the knowledge graph 200 (FIG. 2) are directed versus undirected. For example, the training process may be "true" only for input edges that are directed edges.

Consider a first illustrative training example for a first path, with reference now to FIG. 2. In this example, the starting node for the first path is tentatively defined as the first node 201 (Methotrexate). An intermediate node for the first path is tentatively defined as the third node 205 (DHFR gene), and a terminating node for the first path is tentatively defined as the fourth node 207 (Osteosarcoma). The first path may be tentatively denoted as {Metotrexate, DHFR, Osteosarcoma→?} in a path query. Upon the application of the nodes of the first path to DNN 300 (FIG. 3) in a cognitive traversal portion of path training, it is determined, based upon access to the entire knowledge graph 200, that a path exists between the starting node and the terminating node, i.e., along the first edge 211 (FIG. 2), the intermediate node, and the third edge 215. Accordingly, the DNN 300 (FIG. 3) outputs a value of zero ("true") for the first path at the output node 308. The output of the DNN 300 is {Metotrexate, DHFR, Osteosarcoma→0}.

Next, consider a second illustrative training example for a second path. Referring again to FIG. 2, the starting node for the second path is defined as the first node 201 (Methotrexate). An intermediate node for the first path is defined as the third node 205 (DHFR gene), and the terminating node for the first path is defined as the sixth node 221 (Embolism). The second path may be denoted as {Methotrexate, DHFR, Embolism→?}. The application of the second path to DNN 300 (FIG. 3) results in a determination that a path does not exist between the starting node and the terminating node. Thus, the DNN 300 outputs a value of one for the second path at the output node 308. The output of the DNN 300 is {Metotrexate, DHFR, Embolism→1}.

Alternatively or additionally, the training may be achieved or accomplished by the DNN 300 (FIG. 3) learning a general fixed-size vector (not depicted) embedding of each node in the knowledge graph 200 (FIG. 2). The embedding may exist in the form of a tensor, a factorization, or an array of components that are functions of the coordinates of a space. This node information can be applied to one or more input nodes 301, 302, or 303, of the DNN 300 (FIG. 3) in order to capture an unsupervised graph structural similarity, and to produce a fixed input size for each node 301, 302, and 303. In situations where variable input sizes are involved, a convolutional neural network could be employed in lieu of, or in addition to, the DNN 300.

The procedure of FIG. 1 progresses from block 103 to block 105 where a path query is received. The path query poses a question as to whether or not a path exists between a source node and a destination node. Then, at block 107, a context for the received query is determined. The context is defined as a set of nodes that have already been traversed, in this example, nodes $x\_\{i-1\} \rightarrow x\_\{i\}$.

The procedure of FIG. 1 progresses from block 107 to block 108, where in a post-training step, the DNN 300 (FIG. 3) captures the embedded semantic information from the knowledge graph 200 (FIG. 2) in response to the path query. Next, at block 109, the DNN 300 (FIG. 3) is used to guide a traversal of the knowledge graph 200 (FIG. 2) based upon the determined context and the captured embedded semantic information. The semantic information of block 108 is captured based upon the training that was previously performed at block 103 (FIG. 1).

Edge distances for the knowledge graph 200 (FIG. 2) are representative of semantic closeness or semantic relatedness. Semantic relatedness includes any relation between two terms, while semantic similarity only includes the narrower "is a" relation. For example, "car" is similar to "bus", but is also related to "road" and "driving." Semantic similarity is where the idea of distance is based on the likeness of meaning or semantic content. Computationally, semantic similarity may be estimated by defining a topological similarity, by using ontologies to define the distance between terms or concepts. For example, a naïve metric for the comparison of concepts ordered in a partially ordered set and represented as nodes of a directed acyclic graph (DAG) (e.g., a taxonomy), would be the shortest path linking the two concept nodes. Based on text analysis, semantic relatedness between units of language (e.g., words or sentences) can also be estimated using statistical means such as a vector space model to correlate words and textual contexts from a suitable text corpus.

With respect to block 103 (FIG. 1), edge distances (semantic closeness) are learned, conditioned upon a context from which exploration of the knowledge graph was started. The context is determined at block 107 by identifying a set of nodes for the knowledge graph 200 (FIG. 2) that have been visited or considered thus far. Consider two starting nodes: the first node 201 representing Methotrexate, and the second node 203 representing Nicotine. The third node 205, representing the DHFR gene, is directly reachable from both the first node 201 and the second node 203. Thus, one may conclude that the first edge 211 connecting Methotrexate to the DHFR gene, and the second edge 213 connecting Nicotine to the DHFR gene, are both associated with correspondingly short distances.

One may attempt to reason about the distance associated with the third edge 215 between the third node 205 (DHFR gene), and the fourth node 207 (Osteosarcoma). However, the result of such analysis is context-dependent. For example, if the starting point was the first node 201 (Methotrexate), then the distance between the third node 205 (DHFR gene) and the fourth node 207 (Osteosarcoma) is again expected to be small due to the context However, if the starting point was the second node 203 (Nicotine), then the distance between the third and fourth nodes 205, 207 is expected to be rather large due to the context, despite the connection. Therefore, given a starting node, and a set of nodes visited so far, one can formulate a context for a given traversal, and exploit this context comprising the starting node and the nodes visited thus far to navigate through a dense and complex knowledge graph 200.

In some embodiments, the path query of block 105 (FIG. 1) uses vector space models from the knowledge graph 200 (FIG. 2) to implement a traversal operator, which specifies a cognitive traversal problem for the knowledge graph 200. This cognitive traversal problem can be formalized as a likelihood of reaching a next node $x\_\{i+1\}$ from an immediately preceding node $x\_\{i\}$, given a context that a set of preceding nodes $x\_\{i-1\} \rightarrow x\_\{i\}$ has already been traversed (see FIG. 1, block 107). Alternatively or additionally, the cognitive traversal problem may be formulated as a closeness, a relatedness, or a proximity of $x\_\{i\} \rightarrow x\_\{i+1\}$ or $x\{i-1\} \rightarrow x\{i+1\}$. The traversal formulation can be further generalized to $G'\text{-?} \rightarrow x\{i+1\}$, where G' is a subgraph (G'\subset of the knowledge graph 200) that has been visited thus far, and which is defined as the context.

To provide cognitive traversal during test time or run time at blocks 105-109 (FIG. 1) when a query is received, the input to the DNN 300 (FIG. 3) comprises three or more nodes: $x\_\{i-1\}$, $x\_\{i\}$, and $x\_\{i+1\}$. The nodes $x\_\{i-1\} \rightarrow x\_\{i\}$ (and the edges joining these nodes) have all been visited and thus comprise the context. The node $x\_\{i+1\}$ is one of many possible choices for a next node to be visited. If the DNN 300 produces an output that is close to zero, then it is inferred that this next node $x\_\{i+1\}$ is semantically related and in close proximity, with a high likelihood conditioned upon the context of already visited nodes. Otherwise, $x\_\{i+1\}$ is considered to be semantically unrelated. Next, one or more nodes at the closest distances to a previously visited node are explored.

The operations of blocks 105-109 (FIG. 1) are further illustrated with reference to the following example. Assume that a path query is received during test time or run time (block 105) for a path that includes the second node 203 (FIG. 2), the second edge 213, the third node 205, and the fourth node 207. Therefore, the path query is: {Nicotine, DHFR, Osteosarcoma→?}. The context of the path query is determined at block 107 (FIG. 1) by identifying a previously visited subgraph 230 (FIG. 2) of the knowledge graph 200. In the present example, the previously visited subgraph 230 includes the second node 203 representing Nicotine, the second edge 213 representing inhibition, and the third node 205 representing the DHFR gene. Thus, the present context includes Nicotine, inhibition, and the DHFR gene. Next, at block 109 (FIG. 1), the DNN 300 (FIG. 3) is used to guide a traversal of the knowledge graph 200 (FIG. 2) based upon the determined context of Nicotine, inhibition, and the DHFR gene, along with the embedded semantic information retrieved from the knowledge graph 200. The DNN 300 (FIG. 3) can be considered to function as a pseudo oracle during test time or run time (FIG. 1, block 109).

According to some embodiments of the invention, the input applied to the input nodes 301, 302, and 303 of the DNN 300 (FIG. 3) during training (FIG. 1, block 103), or during testing (block 105), or during both training and testing, is a set of nodes from the knowledge graph 200 (FIG. 2). Each node in the set of nodes from the knowledge graph 200 can be represented by a graph or textual embedding using a vector space model. Furthermore, one or more relationships among the set of nodes can either be provided explicitly as ground truths, or could be derived implicitly through subgraph mining. Subgraph mining may comprise finding common subgraphs or common collections of sub-relations within the knowledge graph 200.

According to some embodiments of the invention, a portion of the input applied to the input nodes 301, 302, and 303 of the DNN 300 (FIG. 3) during training (FIG. 1, block 103) or during testing (block 105), or during both training and testing, is reserved for new unseen entities or nodes. Thus, no embedding information will be available during the testing. The DNN 300 (FIG. 3) is configured so as to process both seen and unseen (i.e., both present and future) new entities and nodes. Thus, a portion of the input applied to the input nodes 301, 302, and 303 is dedicated to unseen new entities in order to allow the DNN 300 to explicitly learn one or more relationships between seen and unseen elements during training.

Figure 4:
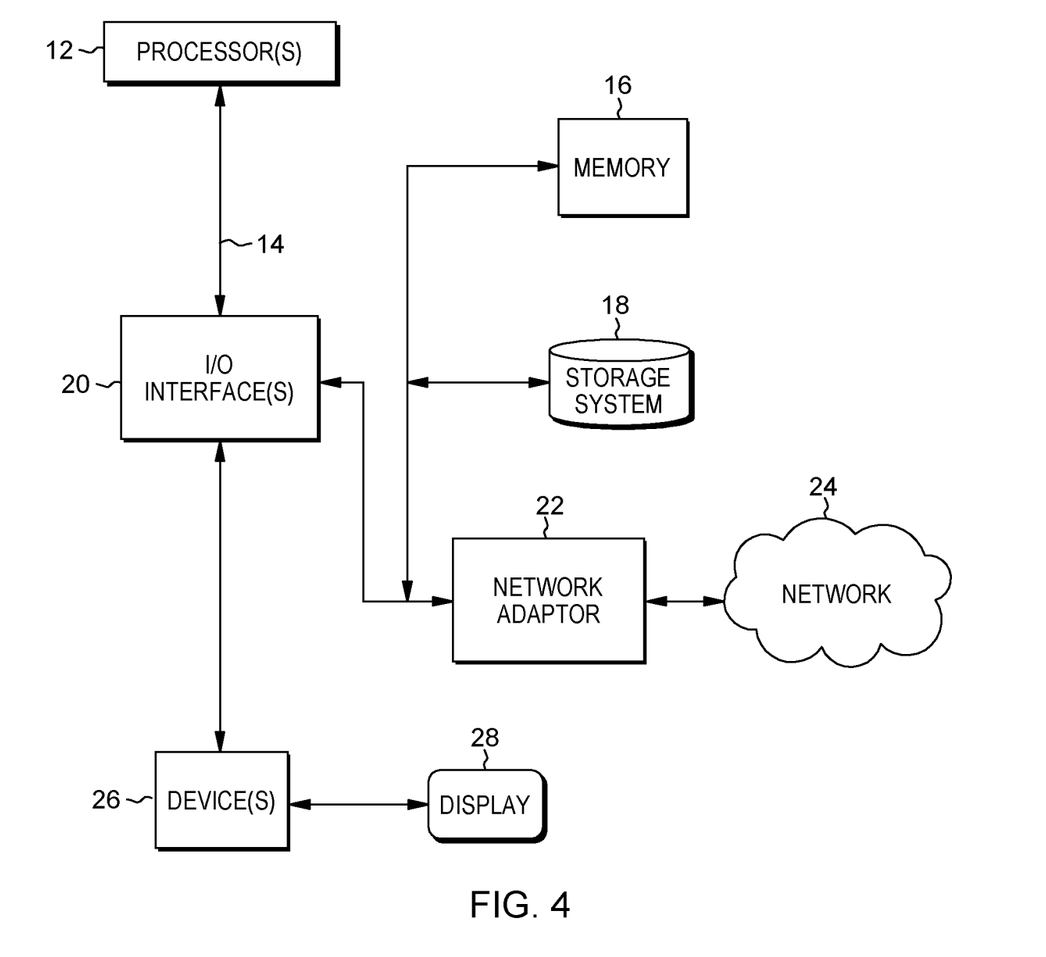
FIG. 4 illustrates an exemplary system for traversing a knowledge graph in accordance with one or more embodiments of the present invention.

FIG. 4 illustrates an exemplary system for traversing a knowledge graph in accordance with one or more embodiments of the present invention. The computer system depicted is only one example of a suitable system and is not intended to suggest any limitation as to the scope of use or functionality of embodiments of the invention. The system shown may be operational with numerous other general-purpose or special-purpose computing system environments or configurations. Examples of well-known computing systems, environments, and/or configurations that may be suitable include, but are not limited to, personal computer systems, server computer systems, thin clients, thick clients, handheld or laptop devices, multiprocessor systems, microprocessor-based systems, neural networks, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

As depicted in FIG. 4, the components of the computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for traversing a knowledge graph including a plurality of nodes connected by a plurality of edges, each edge of the plurality of edges representing embedded semantic information, the method comprising: receiving the knowledge graph at a deep neural network (DNN); capturing the embedded semantic information by the DNN by subjecting the DNN to a path-based training process for use in predicting whether or not a path exists between a starting node and a terminating node, the path including at least one intervening node between the starting node and the terminating node; receiving a path query at the DNN specifying the starting node of the knowledge graph and the terminating node of the knowledge graph; determining a context for the received path query; traversing the knowledge graph, based on the context and the embedded semantic information, in response to said receiving a path query at the DNN specifying the starting node of the knowledge graph and the terminating node of the knowledge graph, said traversing comprising performing a cognitive traversal process for analyzing the knowledge graph as a likelihood of reaching a next node to be traversed in the knowledge graph, given the determined context of the knowledge graph; learning a fixed-size vector based on the embedded semantic information embedded in one or more edges of the plurality of edges; capturing an unsupervised graph structural similarity; and generating a fixed input size for the starting node and the terminating node specified in the path query.

2. The computer-implemented method of claim 1, wherein said determining the context further comprises determining the context by identifying one or more previously traversed nodes of the knowledge graph.

3. The computer-implemented method of claim 1, wherein the embedded semantic information comprises a corresponding semantic relatedness for each respective edge of the plurality of edges.

4. The computer-implemented method of claim 1, wherein each node of the plurality of nodes is represented using a textual embedding procedure in a vector space model.

5. The computer-implemented method of claim 1, further comprising explicitly establishing one or more relationships among at least two of the plurality of nodes, using one or more path queries, said one or more path queries evaluated as true or false.

6. The computer-implemented method of claim 1, further comprising selecting a process from the group consisting of: (a) deriving one or more respective relations among at least two of the plurality of nodes using subgraph mining by searching for one or more common subgraphs of the knowledge graph, or by searching for a common collection of subrelations within the knowledge graph; (b) reserving a portion of an input of the knowledge graph for new entities or nodes that are subsequently added to the knowledge graph; and (c) combinations of said (a) and said (b).

7. The computer-implemented method of claim 1, wherein the path-based training process uses vector space models from the knowledge graph to implement a traversal operator.

8. A computer program product for traversing a knowledge graph including a plurality of nodes connected by a plurality of edges, each edge of the plurality of edges representing embedded semantic information, the computer program product comprising a computer-readable storage medium having a computer-readable program stored therein, wherein the computer-readable program, when executed on a deep neural network (DNN) including at least one processor, causes the at least one processor to perform: receiving the knowledge graph at the DNN; capturing the embedded semantic information by the DNN by subjecting the DNN to a path-based training process for use in predicting whether or not a path exists between a starting node and a terminating node, the path including at least one intervening node between the starting node and the terminating node; receiving a path query at the DNN specifying the starting node of the knowledge graph and the terminating node of the knowledge graph; determining a context for the received path query; traversing the knowledge graph, based on the context and the embedded semantic information, in response to said receiving the path query at the DNN specifying the starting node of the knowledge graph and the terminating node of the knowledge graph, said traversing comprising performing a cognitive traversal process for analyzing the knowledge graph as a likelihood of reaching a next node to be traversed in the knowledge graph, given the determined context of the knowledge graph; learning a fixed-size vector based on the embedded semantic information embedded in one or more edges of the plurality of edges; capturing an unsupervised graph structural similarity; and generating a fixed input size for the starting node and the terminating node specified in the path query.

9. The computer program product of claim 8, wherein the DNN includes at least one processor, and wherein the computer-readable program, when executed on the DNN, causes the at least one processor to determine the context by identifying one or more previously traversed nodes of the knowledge graph.

10. The computer program product of claim 8, wherein the embedded semantic information comprises a corresponding semantic relatedness for each respective edge of the plurality of edges.

11. The computer program product of claim 8, wherein the DNN includes at least one processor, and wherein the computer-readable program, when executed on the DNN, is further configured for representing each node of the plurality of nodes using a textual embedding procedure in a vector space model.

12. The computer program product of claim 8, wherein the DNN includes at least one processor, and wherein the computer-readable program, when executed on the DNN, is further configured for explicitly establishing one or more relationships among at least two of the plurality of nodes, using one or more path queries, said one or more path queries evaluated as true or false.

13. The computer program product of claim 8, wherein the DNN includes at least one processor, and wherein the computer-readable program, when executed on the DNN, is further configured for selecting a process from the group consisting of: (a) deriving one or more respective relations among at least two of the plurality of nodes using subgraph mining by searching for one or more common subgraphs of the knowledge graph, or by searching for a common collection of subrelations within the knowledge graph; (b) reserving a portion of an input of the knowledge graph for new entities or nodes that are subsequently added to the knowledge graph; and (c) a combination of said (a) and said (b).

14. An system for traversing a knowledge graph including a plurality of nodes connected by a plurality of edges, each edge of the plurality of edges representing embedded semantic information, the system comprising a deep neural network (DNN) including at least one processor and a memory coupled to the at least one processor, wherein the memory comprises instructions which, when executed by the at least one processor, cause the at least one processor to perform: receiving the knowledge graph at a deep neural network (DNN); capturing the embedded semantic information by the DNN by subjecting the DNN to a path-based training process for use in predicting whether or not a path exists between a starting node and a terminating node, the path including at least one intervening node between the starting node and the terminating node; receiving a path query at the DNN specifying the starting node of the knowledge graph and the terminating node of the knowledge graph; determining a context for the received path query; traversing the knowledge graph, based on the context and the embedded semantic information, in response to said receiving the path query at the DNN specifying the starting node of the knowledge graph and the terminatinq node of the knowledge graph, said traversing comprising performing a cognitive traversal process for analyzing the knowledge graph as a likelihood of reaching a next node to be traversed in the knowledge graph, given the determined context of the knowledge graph; learning a fixed-size vector based on the embedded semantic information embedded in one or more edges of the plurality of edges; capturing an unsupervised graph structural similarity; and generating a fixed input size for the starting node and the terminatinq node specified in the path query.

15. The system of claim 14, wherein the memory comprises instructions which, when executed by the at least one processor, cause the at least one processor to further perform: determining the context by identifying one or more previously traversed nodes of the knowledge graph; and wherein the embedded semantic information comprises a corresponding semantic relatedness for each respective edge of the plurality of edges.

\* \* \* \* \*